US008360890B2

(12) United States Patent
Tyler

(10) Patent No.: US 8,360,890 B2
(45) Date of Patent: *Jan. 29, 2013

(54) ONLINE GAMING CHEATING PREVENTION SYSTEM AND METHOD

(75) Inventor: Matthew George Tyler, Arlington, VA (US)

(73) Assignee: MGT Gaming Tech, L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/641,920

(22) Filed: Dec. 18, 2009

(65) Prior Publication Data

US 2010/0178980 A1 Jul. 15, 2010

Related U.S. Application Data

(60) Continuation of application No. 11/642,722, filed on Dec. 21, 2006, now Pat. No. 7,654,903, which is a division of application No. 10/229,023, filed on Aug. 28, 2002, now Pat. No. 7,169,050.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/42; 463/29; 463/40; 463/41; 463/43

(58) Field of Classification Search .................... 463/29, 463/40–43
See application file for complete search history.

(56) References Cited

U.S. PATENT DOCUMENTS

| 6,527,638 | B1 | 3/2003 | Walker et al. | |
|---|---|---|---|---|
| 6,899,628 | B2 * | 5/2005 | Leen et al. | 463/42 |
| 7,169,050 | B1 | 1/2007 | Tyler | |
| 7,654,903 | B2 | 2/2010 | Tyler | |
| 2003/0027639 | A1 * | 2/2003 | Peterson et al. | 463/42 |
| 2004/0015868 | A1 * | 1/2004 | Dutta et al. | 717/126 |
| 2004/0127277 | A1 | 7/2004 | Walker et al. | |
| 2004/0242321 | A1 * | 12/2004 | Overton | 463/29 |

OTHER PUBLICATIONS

PunkBuster for Server Administrators, Even Balance, Inc., May 17, 2004, pp. 3-4, 5, and 6, http://www.punkbuster.com/publications/admins/in- dex.htm.
"How does VAC/VSM work?" CSH Network, http://www.mirc-scripts.de/pn/html/modules.php?op=modload&name=FAQ&file=index&myfaq=yes&idsub-cat=9, Accessed May 9, 2006.
"The Valve Anti-Cheat Module," Counter-Server—The Official Counter Strike Server Administration Resource, http://server.counter.sub.--strike.net/server.php?cmd=VAC, Accessed May 9, 2006.
Geoff Gasior, "Valve Bans online cheaters," The Tech Report—Comments on Valve bans online cheaters, Aug. 26, 2002, http://techreport.com/news.sub-- reply.x/4010, Accessed May 9, 2006.
"Online cheaters face games ban," BBC News, Aug. 29, 2002, http://news.bbc.co.uk/1/hi/technology/2221335.stm, Accessed May 9, 2006.

(Continued)

*Primary Examiner* — David L Lewis
*Assistant Examiner* — Adetokunbo Torimiro

(57) ABSTRACT

A method, system, and software for preventing cheating during online gaming, including a first online gaming server computer system configured to gather information regarding cheaters detected during online gaming; a second online gaming server computer system configured to receive the information; and a central database configured for aggregating the received information regarding cheaters detected during online gaming gathered by the first online gaming server computer system along with information stored on the central database regarding cheaters detected during online gaming gathered from a plurality of online gaming server computer systems. The aggregated information from the central database regarding cheaters detected is made available to the second online gaming server computer system, and cheaters identified in the aggregated information are prevented from online gaming on the second online gaming server computer system based on the aggregated information from the central database.

19 Claims, 4 Drawing Sheets

OTHER PUBLICATIONS

Steve Gibson, "CS Cheaters Beware," Shocknews, http://www.shacknews.com/onearticle.x/21540, Dated: Jul. 16, 2002, Accessed May 9, 2006.
"About Auto-mbl," PunksBusted.com, http://www.punksbusted.com/fourms/index.php?showtopic=41, Accessed May 9, 2006.
"Plant Call of Duty," Punk Buster Auto-MBL—Press Release, http://www.planetcallofduty.com, Accessed May 9, 2006.
"VAC Security Module Updated Again," http://www.mv-cs.com/main.cfm, printed on Aug. 30, 2002, 1 page.
"The Future of VAC," http://www.mv-cs.com/article.cfm?ItemID=108, printed on Aug. 30, 2002, 1 page.
Smith, E., "Postnuke Content Management, New Valve Anti-Cheat (VAC) Security Modules," http://www.railgun.net/print.php?sid=107, Printed on Aug. 30, 2002, 1 page.
HLGuard, United Admins Gamer Server Admin Association, http://unitedadmins.com/HLGuard.aspx, Printed on Jul. 16, 2002, 1 page.
CSGuard, United Admins Gamer Server Admin Association, http://unitedadmins.com/CSGuard.aspx, Printed on Jul. 16, 2002, 1 page.
http://www.wassergekeuhlt.de/ph/download/CheaterLog, Printed on Sep. 10, 2002, 10 pages.
http://blacklist.4players.de:1040/, Blacklist Network, Printed on Sep. 10, 2002, 3 pages.

* cited by examiner

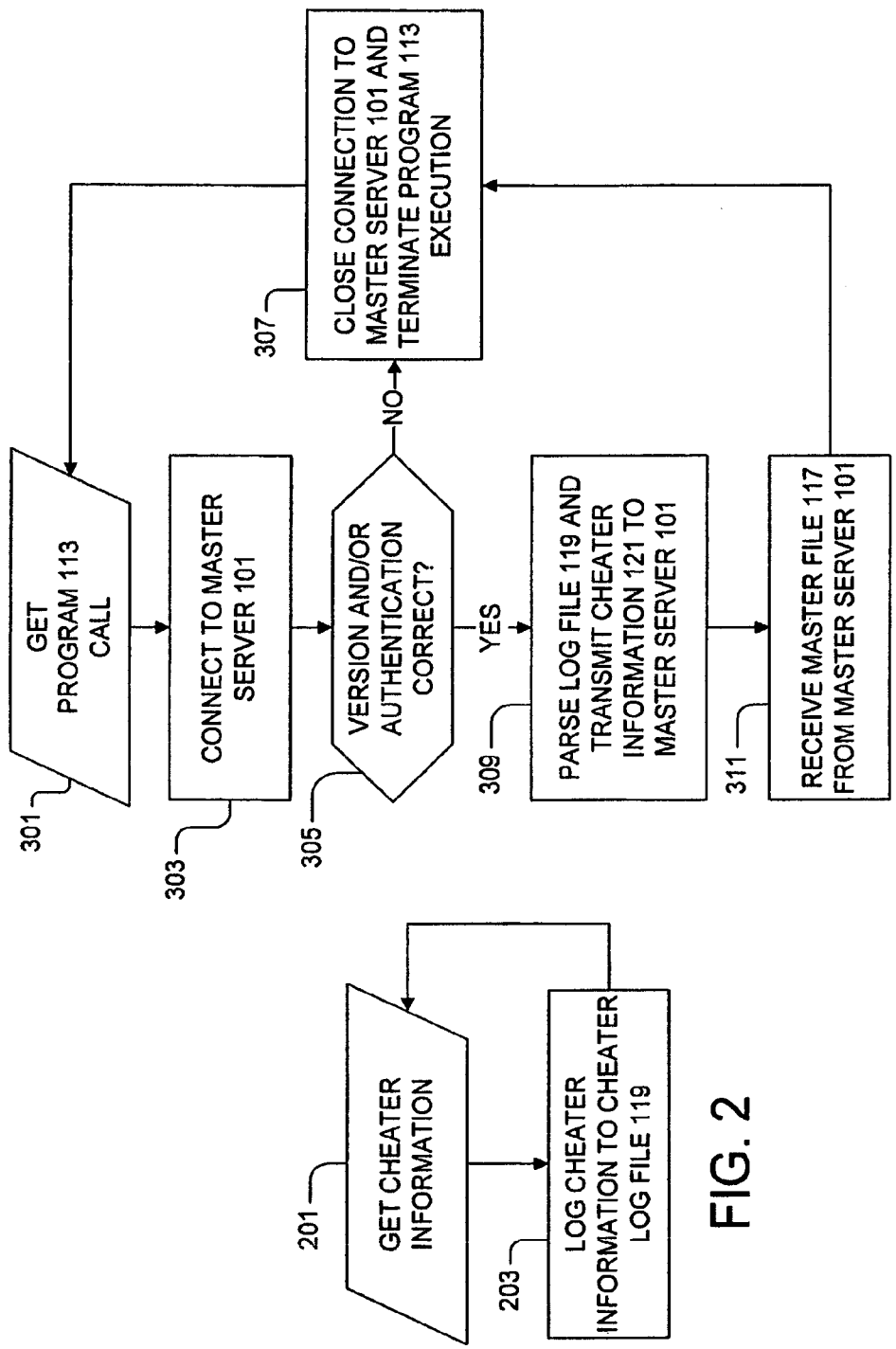

ONLINE GAMING CHEATING PREVENTION SYSTEM AND METHOD

CROSS REFERENCE TO RELATED DOCUMENTS

This application is a divisional application of commonly assigned, U.S. patent application Ser. No. 10/229,023 of TYLER, entitled "ONLINE GAMING CHEATING PREVENTION SYSTEM AND METHOD," filed Aug. 28, 2002, now allowed, the entire disclosure of which is hereby incorporated by reference herein.

BACKGROUND OF THE INVENTION

1. Field of the Invention

The present invention generally relates to online gaming computer systems, and more particularly to a method and system for preventing cheating on online gaming computer systems.

2. Discussion of the Background

In recent years, online gaming has seen a dramatic increased in popularity. For example, in the year 2000, computer and video game sales in the U.S. were estimated at 6 billion dollars, with 219 million computer and video games sold and with a majority of the games including an online play capability. The popularity of online gaming will only increase in the future. However, as online gaming popularity increases, so do the number of players employing various types of cheats, hacks, and exploits.

Cheating in online games, defined as an attempt by a player to gain an unfair advantage over other players through exploitation of bugs in or manipulation or hacking of online gaming software, is a widespread and serious problem that negatively affects the level of entertainment and enjoyment legitimate or non-cheating players get from playing online games. Most online games use an architecture involving a game client program or software, including the client-side and display code, which is activated and interfaced by the player, and a game server program or software, which allows a number of clients to interact with each other in an online gaming environment.

There have been various programs or software developed to aid in the detection and identification of cheating players on individual game servers. However, such programs are easily bypassed, so that cheaters can continue cheating during online games. Therefore, there is a need for a method and system that can prevent cheating on online gaming computer systems, even for cheaters that try to circumvent cheat detection programs running on individual game servers.

SUMMARY OF THE INVENTION

The present invention includes recognition that while cheat detection and/or game server software may allow a server administrator to remove or permanently ban detected or suspected cheaters from a game server, this by itself is not a complete solution to the cheating problem. For example, game servers are typically operated by multiple independent entities or individuals not affiliated with each other and with no higher oversight authority. As a result, individual game servers themselves are often the highest authority to which a cheating player must answer. As there can be thousands or tens of thousands of separate game servers available for a player to join, a cheating player is able to simply join a game server from which the cheating player has not been banned in order to continue cheating and thereby circumvent any cheat detection performed on the other game servers. Therefore, there is a need for a method and system that can prevent cheating on online gaming computer systems, even for cheaters that try to circumvent cheat detection programs running on individual game servers by jumping from game server to game server.

The above and other needs are addressed by the present invention, which provides an additional level of authority, above the individual game servers, via a master database of cheaters that resides on one or more master servers and with which individual game servers communicate to transmit cheaters banned on the individual game servers and to receive a master list of cheaters aggregated from the individual game servers. In this way, once a cheater is banned on one game server, information identifying the cheater is transmitted to the master databases of the master servers for distribution to the other game servers. Advantageously, cheaters can no longer move from game server to game server in an attempt to continue cheating.

Accordingly, one aspect of the present invention relates to a method, system, and software for preventing cheating during online gaming, including a first online gaming server computer system configured to gather information regarding cheaters detected during online gaming; a second online gaming server computer system configured to receive the information; and a central database configured for aggregating the received information regarding cheaters detected during online gaming gathered by the first online gaming server computer system along with information stored on the central database regarding cheaters detected during online gaming gathered from a plurality of online gaming server computer systems. The aggregated information from the central database regarding cheaters detected is made available to the second online gaming server computer system, and cheaters identified in the aggregated information are prevented from online gaming on the second online gaming server computer system based on the aggregated information from the central database.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flowchart depicting processes performed by an exemplary cheater detection program;

FIG. 3 is a flowchart depicting processes performed by an exemplary cheater prevention client program;

DETAILED DESCRIPTION OF THE PREFERRED EMBODIMENTS

An online gaming cheater prevention system and method are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Figure 1:
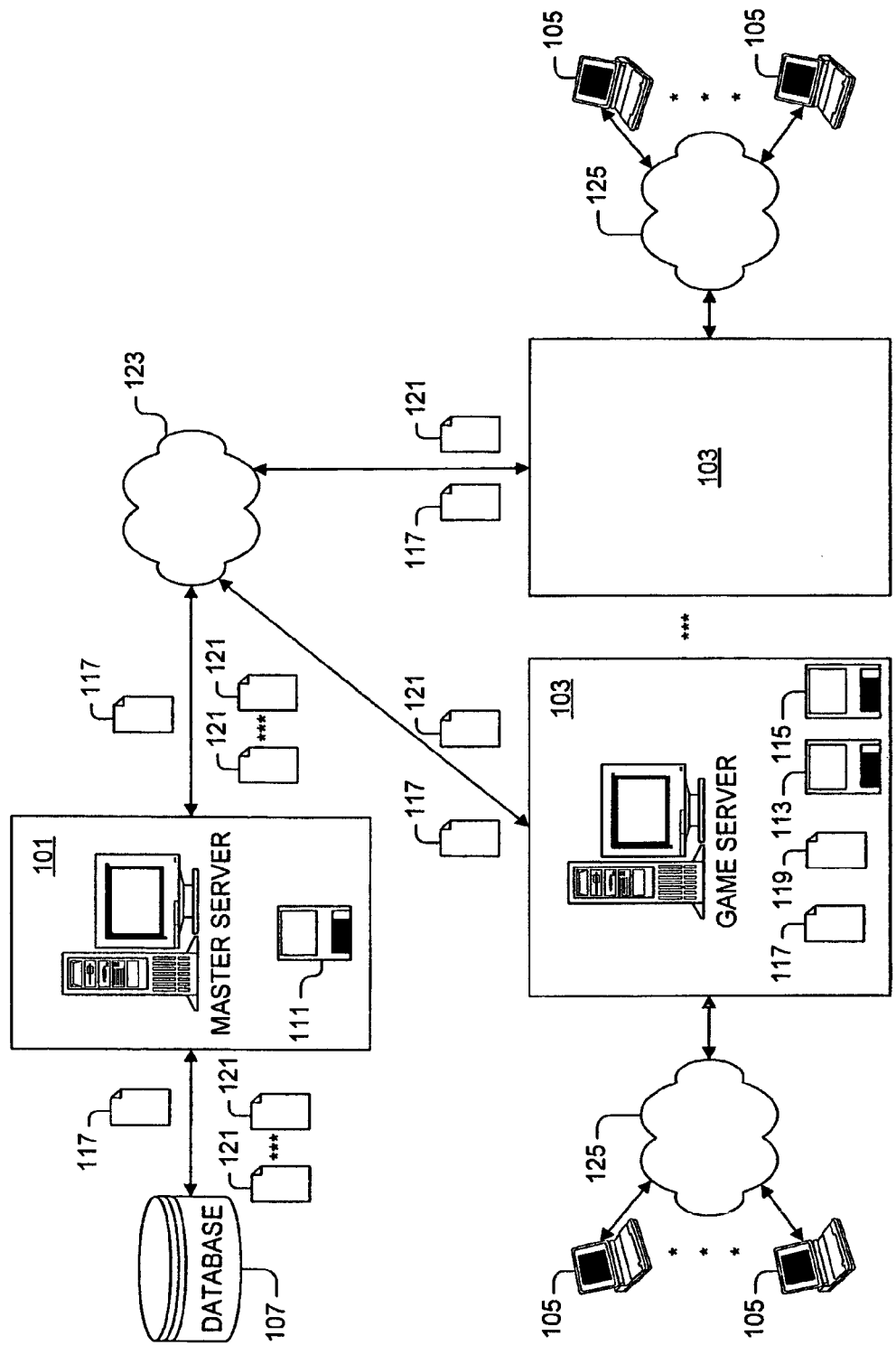
FIG. 1 is a block diagram depicting an online gaming cheater prevention system, according to an embodiment of the present invention.

Referring now to the drawings, wherein like reference numerals designate identical or corresponding parts throughout the several views, and more particularly to FIG. 1 thereof, there is illustrated an online gaming cheater prevention system 100, according to an embodiment of the present invention.

In FIG. 1, generally, the cheater prevention system 100 provides for centralization and sharing of a master file 117 of identified online gaming cheaters. The system 100 includes, for example, a cheating prevention Server Module, including one or more master servers 101 and master databases 107, and a cheater prevention server program or software 111. The system 100 further includes, for example, a cheating prevention Client Module, including one or more individual game servers 103, a cheater prevention client program or software 113, and a cheat detection program 115.

The master server 101 communicates with the master database 107 for storing information about identified cheating players, for example, including Internet Protocol (IP) addresses of the cheating players, in-game names or handles of the cheating players, unique online gaming identifications (IDs, e.g., WonIDs used in several popular online games, etc.) of the cheating players, etc. The cheater prevention server program 111 running on the master server 101 handles the connection with the cheater prevention client programs 113 running on the game servers 103 and interacts with the master database 107. The cheater prevention client program 113 and the cheat detection or anti-cheat program 115 reside on the individual game servers 103.

The master database 107 receives instructions (e.g., database update instructions, database query instructions, etc.) from the cheater prevention server program 111. The master database 107 also receives, via the cheater prevention server program 111, new cheater entries or information 121 extracted by the cheater prevention client programs 113 from cheater log files 119 of cheaters detected on and/or banned from the game servers 103. Accordingly, the master server 101 communicates with the master database 107 and the cheater prevention server program 111. The game servers 103 provide online game connectivity for one or more online gaming clients 105.

The software portion of the cheater prevention Client Module resides on the game servers 103 and includes the cheat detection and/or logging program 115 (e.g., HLGuard, CSGaurd, etc.) and the cheater prevention client program or software 113. The cheater prevention client program 113 provides connectivity between the cheater prevention client program 113 of the Client Module and the cheater prevention server program 111 of the Server Module.

Accordingly, the devices and subsystems of the cheater prevention system 100 of FIG. 1 can include, for example, any suitable servers, workstations, personal computers (PCs), laptop computers, PDAs, Internet appliances, set top boxes, modems, handheld devices, telephones, cellular telephones, wireless devices, other devices, etc., capable of performing the processes of the embodiments of the present invention. The devices and subsystems can communicate with each other using any suitable protocol and can be implemented using the computer system 500 of FIG. 5, for example. One or more interface mechanisms can be used in the system 100 including, for example, Internet access, telecommunications in any form (e.g., voice, modem, etc.), wireless communications media, etc.

Accordingly, communications network 123 connecting the master sever 101 with the game servers 103 and communications network 125 connection the game servers 103 with the online gaming clients 105 can include, for example, wireless communications networks, cellular communications networks, G3 communications networks, Public Switched Telephone Networks (PSTNs), Packet Data Networks (PDNs), the Internet, intranets, etc. In addition, the communications networks 123 and 125 can be the same or different networks, as will be appreciated by those skilled in the relevant art(s).

It is to be understood that the system 100 of FIG. 1 is for exemplary purposes, as many variations of the specific hardware used to implement the embodiments of the present invention are possible, as will be appreciated by those skilled in the relevant art(s). For example, the functionality of the devices and the subsystems of the system 100 can be implemented via one or more programmed computer systems or devices.

To implement such variations as well as other variations, a single computer system (e.g., the computer system 500 of FIG. 5) can be programmed to perform the special purpose functions of one or more of the devices and subsystems of the system 100. On the other hand, two or more programmed computer systems or devices can be substituted for any one of the devices and subsystems of the system 100. Accordingly, principles and advantages of distributed processing, such as redundancy, replication, etc., also can be implemented, as desired, to increase the robustness and performance of the system 100, for example.

FIG. 2 is a flowchart depicting processes performed by an exemplary cheater detection program 115 running on the game servers 103 of FIG. 1. As the online game clients or players 105 connect to the game server 103, the cheat detection/logging program 115 scans for the clients 105 using known or suspected cheats. Upon detection of a cheating client or player 105, the relevant information about the cheater is logged to the cheater log file 119 by the cheat detection/logging software 115. Accordingly, in FIG. 2, at step 201, the cheater detection/logging program 115 gets detected cheater information and logs the cheater information to the log file 119, at step 203. Execution then returns to step 201, completing the cheater information logging processing.

FIG. 3 is a flowchart depicting processes performed by an exemplary cheater prevention client program 113 running on the game servers 103 of FIG. 1. Generally, the cheater log file 119 is read and parsed by the cheater prevention client program 113. Then, when the cheater prevention client program 113 is appropriately commanded or called, the cheater prevention client program 113 attempts to connect to the master server 101 to transmit the cheater information 121.

Accordingly, in FIG. 3, at step 301, the cheater prevention client program 113 is called and then connects to the master server 101, at step 303. Once a stable connection is established between the master server 101 and the game server 103, at step 305, the cheater prevention client program 113 waits for the cheater prevention server program 111 to perform an authentication process. The authentication process can be performed, for example, by the cheater prevention server program 111 comparing the IP address associated with the game server 103 running the cheater prevention client program 113 with a list of authorized game servers 103 and/or by checking a security password. This feature, however, is optional and no authentication can be performed, if desired.

If the authentication fails, the connection is closed, at step 307. Otherwise, upon positive authentication or upon disabling of the authentication feature, the cheater prevention client program 113 waits for the cheater prevention server program 111 to verify software versions to ensure compatibility, at step 305. If the version comparison fails, the connection can be terminated, at step 307.

Otherwise, at step 309, the cheater prevention client program 113 reads and parses the cheater log file 119 generated by the anti-cheat software 115 and transmits the cheater information 121 extracted from the log file 119 to the master server 101. Then, at step 311, the master server 101 then appends and stores the new cheater entries from the cheater information 121 into the master file 117 on the master database 107. The cheater prevention client program 113 then receives the master file 117 of the cheaters identified by the various game servers 103 from the master server 101.

The cheater prevention client program 113, at step 311, also stores the cheater information from the master file 117 into one or more files that can be read by online gaming software running on the game server 103. Advantageously, the cheating players listed in the master file 117 are automatically banned by the online gaming software on the game server 103. Then, at step 307, the cheater prevention client program 113 closes the connection with the master server 101 and terminates execution, and returns to step 301 to wait for the next program call, completing the cheater prevention client process.

Figure 4:
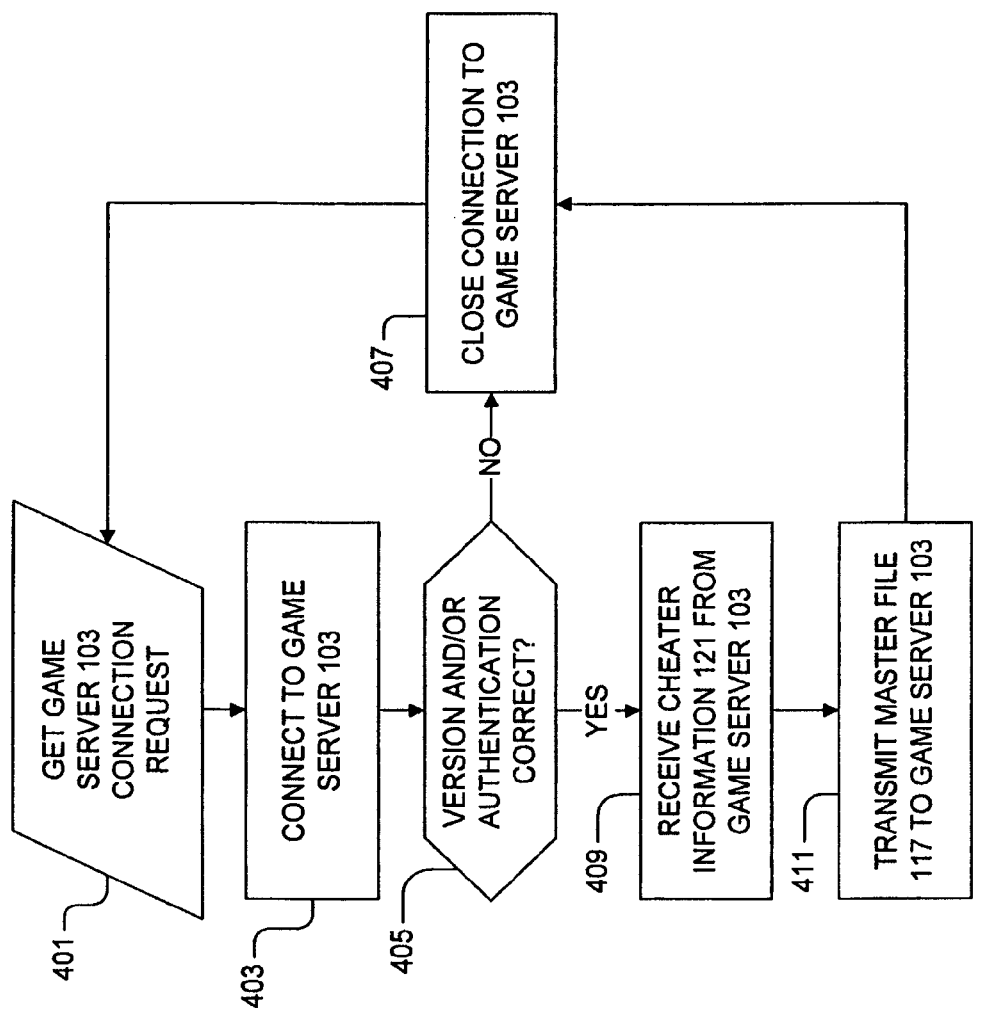
FIG. 4 is a flowchart depicting processes performed by an exemplary cheater prevention server program.

FIG. 4 is a flowchart depicting processes performed by an exemplary cheater prevention server program 111 running on the master server 101. As noted above, the Server Module includes, for example, the master database 107, including the master list 117 of cheaters, and the cheater prevention server program or software 111. Accordingly, in FIG. 4, at step 401, the cheater prevention server program 111 listens for or gets connection requests from the cheater prevention client programs 113 running on the game servers 103.

When a connection is requested and after a connection is established, at step 403, the cheater prevention server program 111 optionally performs the previously described authentication process, followed by the previously described version checking process, at step 405, and closes the connection, at step 407, if necessary. Otherwise, at step 409, the cheater prevention server program 111 receives the cheater information 121, parsed from the log file 119 by the cheater prevention client program 113, from the cheater prevention client program 113. Then, at step 411, the cheater prevention server program 111 transmits the updated master file 117 to the cheater prevention client program 113. The connection is then closed, at step 407, and control returns to step 401 for further cheater information 121 processing, completing the cheater prevention server process.

An exemplary implementation of the present invention will now be described. The cheater prevention program (e.g., written in Perl, C++, etc.), including the Server and Client modules, allows the online game (e.g., Half-Life, Counter-strike, etc.) servers 103 to transmit the cheater information 121 regarding cheaters during online games to the master database 107 and automatically receive master files 117 of cheaters (e.g., banned cheaters) from participating game servers 103 from the master database 107. The cheater prevention client program 113 automatically parses the anti-cheat program 115 (e.g., CSGuard, HLGuard, etc.) log files 119 of detected online game cheaters that are in a standard log format and transmits the cheater information 121 to the master server 101, where the data is stored in the master file 117 on the master database 107 by the server module. Game server plugins 115 (e.g., CSGuard, HLGuard, etc.) perform the cheater detection on the individual game servers 103.

The cheater prevention program 113 can be implemented, for example, as a standalone executable program. The cheater prevention client program 113 can work in conjunction with an automatic execution scheduling program (e.g., Cron, etc.) for scheduled execution operation. The client program 113 runs on an Operating System (OS) capable of running a dedicated game server 103, such as a Half-Life Dedicated Server (HLDS), etc., and remote system access can be employed. In a preferred embodiment, the client program 113 is not configured as a server module or a plugin (e.g., an adminmod plugin, etc.) so that the client program 113 is not run via file transfer protocol (FTP), etc. However, the client program 113 can be configured as a server module or a plugin (e.g., an adminmod plugin, etc.) so that the client program 113 can run via FTP, etc., as will be appreciated by those skilled in the relevant art(s)

As noted above, the cheater prevention client program 113 works on systems that support online games (e.g., Half-Life with any of the various configurations, etc.). In the Windows environment, the master file 117 and the cheater log file 119 (e.g., a *.cfg file, etc.) paths employ forward slashes ("/") rather than the standard Windows backslash ("\"). Accordingly, the path "c:\Windows\Desktop" would be written as "c:/Windows/Desktop."

Although an infinite number of possible log formats can be employed, the cheater prevention client program 113 employs a standard log format. Accordingly, an end user of the online game server 103 can add a line to the configuration file of the anti-cheat detection program 115 (e.g., CSGuard, HLGuard, etc.) to appropriately format output for the cheater prevention client program 113. For example, the standard log format can be given by:

mm/dd/yyyy:cheatername:wonid:ip:cheattype where mm/dd/yyyy is a timestamp in month, day, and year format, cheatername is an online handle or name used by a detected cheater, wonid is an online gaming identification (e.g., a WON identification) of the detected cheater, ip is an Internet Protocol (IP) address of the online gaming client 105 of the detected cheater, and cheattype is the type of online game cheat detected.

The data that is relevant to cheater prevention program 113, for example, is included in a single string separated by colons. Advantageously, this simple yet effective format all but eliminates the chance for errors in parsing and conserves memory space and bandwidth. For most anti-cheat detection programs 115, one line can be added to the configuration file. For example, in the case of the HLGuard anti-cheat detection program 115, the following line is added to the configuration file (e.g., csgconfig.cfg):

csg_action "b:found" "csg_writefile cstrike/cheaterlist.txt;
    csg_write\"%d:%n:%w:%i:%y\""

where cheaterlist.txt is the cheater log file 119 that the detected cheater information is stored in, %d:%n:%w:%i:%y is the standard format described above, and the remaining terms are commands specific to the HLGuard anti-cheat detection program 115.

In the above example, the added command line is written as one line (e.g., not including any hard returns). In a similar manner, other types of anti-cheat detection programs 115 can be configured to support the Standard format. If the game server 103 is rented from a hosting company (e.g., Martnet, TheNetGamer, etc.), the hosting company can technically support the cheater prevention program 113 by providing any necessary system and program access and permit use of the program 113.

In a preferred embodiment, only cheaters who are actually banned from a game server 103 are added to the master file 117. Otherwise, minor offenders and questionable cheaters (e.g., cheaters detected by methods that are potentially faulty, such as aimbot detection, etc.) can get added to the master file 117, leading to undesirable results.

The cheater prevention client program 113 can be installed by storing the executable program file scripts on the game server 103 where the anti-cheat program 115 cheater log files 119 are stored. This usually entails some sort of shell access to the game server 103. As noted above, the configuration file (e.g., csgconfig.cfg) for the anti-cheat program 115 can be modified to support the Standard log format. In addition, in the case of the cheater prevention client program 113 being implemented via a Perl script, Perl script support can be installed on the game server 103.

Accordingly, the above process includes extracting executable and other program files (e.g., filename.tar.gz) to a directory where the client program 113 is to reside. For example, this creates an installation instruction file (e.g., Readme.txt), an executable file, (e.g., client.pl) and a configuration file (e.g., config.cfg) for the cheater prevention client program 113.

Advantageously, variables in the cheater prevention client program 113 configuration file can be edited for user customization. For example, the configuration file can include the following variables:

allowupload=1;
allowdownload=1;

where these variables control what action the client program 113 performs when the client program 113 connects to the master server 101. For example, the allowupload variable determines whether or not the client program 113 is to parse the cheater log file 119 and upload the cheater information 121 to the master server 101. The allowdownload variable determines whether or not the client program 113 is to download the latest version of the master file 117 from the master server 101. In both cases, for example, a setting of "1" enables the specified function.

The configuration file also can include the following variable:

port=0;

where this variable control which port on the game server 103 is used by the client program 113. For example, users behind a firewall can specify a port for the client program 113 to use via the port variable. If the port variable is set to zero, a random port can be employed.

The configuration file also can include the following variables:

bannedfilepath=/path/to/csbl_banned.cfg;
cheaterlistpath=/path/to/cheaterlist.txt;

where these variables control which files the client program 113 uses for its operations. For example, the bannedfilepath variable is the full path to the file that the client program 113 writes to when it downloads a new master file 117 (e.g., csbl_banned.cfg) from the master server 101. By default, this file is given a different name than the cheater log file 119 (e.g., banned.cfg), so that it will not overwrite the original cheater log file 119 of the anti-cheat detection program 115. If another name is used, exec yourbannedfilename.cfg can be added to the config.cfg file of the game server 103. The csbl_banned.cfg file gets overwritten every time a new master file 117 is downloaded from the master server 101. The cheaterlistpath variable is the full path to the file cheaterlist.txt that contains the anti-cheat detection program 115 output cheater log file 119 in the Standard log format.

The configuration file also can include the following variable:

verbose=0;

where this variable controls verbose logging. When turned on by being set to a value of 1, details of data transfers are logged for debugging purposes.

The configuration file also can include the following variable:

password=nopass;

where this variable controls the client program 113 authentication on the master server 101. When turned off by being set to a value of nopass, no authentication is performed by the master server 101. Otherwise, the password variable can be set with a valid security password used by the master server 101 for authentication purposes. In this way, the client program 113 hosts with invalid security passwords will not be allowed to connect to the master server 101.

The configuration file also can include the following variable:

max_filesize=1500;

where this variable is employed for game servers 103 having an excessive number of banned player entries (e.g., banid) in a single *.cfg file, which can cause lag, slow game map changes and even crash the game server 103. In one embodiment, the client program 113 automatically distributes the cheater entries to several different files. In this case, these files take the format of the csbl_banned.cfg file name followed by a number (e.g., csbl_banned1.cfg). The csbl_banned.cfg file executes each of such files in sequence. Accordingly, adding exec csbl_banned.cfg to the game server 103 server.cfg file is sufficient. The max_filesize variable controls the maximum number of cheater entries that can be placed in each of such files. Advantageously, if the game server 103 is experiencing lag or crash problems, the value assigned to this variable can be adjusted, as necessary.

As noted above, the configuration file (e.g., csgconfig.cfg for CSGuard, etc.) for the anti-cheat detection program 115 can be edited to create detected cheater log files 119 in the Standard format. Otherwise, the parser in the client program 113 may not work with other formats, including any default anti-cheat program 115 formats. However, the client program 113 can be configured to support formats used by the anti-cheat program 115, as will be appreciated by those skilled in the relevant art(s).

In addition, since the client program 113 downloads the latest master file 117 to a specified file, a single line can be added to the configuration file (e.g., server.cfg, autoexec.cfg, etc.) of the game server 103. For example, if the master file 117 is called csbl_banned.cfg (e.g., the default name), the following line can be added:

exec csbl_banned.cfg

Otherwise, if the master file 117 is called something other than csbl_banned.cfg, the corresponding filename can be substituted for csbl_banned.cfg.

As noted above, for scheduled execution, a program (e.g., Cron) can be used to schedule the client program 113 (e.g., client.pl) to run automatically. For example, a Cron job to run the client program 113 can be scheduled. Although it does not really matter how often the client program 113 is run, running the client program 113 once daily is adequate for most game servers 103. Advantageously, such a schedule will ensure that the master file 117 is updated daily and that new cheaters are logged every time the client program 113 runs.

For example, for scheduling the running of the client program 113 once daily, a crontab of the Cron program can be given by:

Run client program once daily @daily/path/to/client–os where the real path to the client program 113 executable is used in place of path, and the actual name and version for the client program 113 is used in place of client.

Otherwise, manual operation or other programs can be employed to schedule the execution of the client program 113. However, the client program 113 can be modified to perform automatically scheduled execution, as will be appreciated by those skilled in the relevant art(s).

Accordingly, the above and other features of the present invention include, for example, enabling or disabling of client program 113 authentication at the master server 101; optimized network communications; automatic generation of multiple sequential csbl_banned.cfg files to address potential game server lag and efficient program operation; printing of various client program 113 output to console, as an indication that the client program 113 is working properly; providing routines for terminating a connection to the master server 101 to reduce hangs; including a SO_KEEPALIVE variable so dead clients 113 get pushed out of the connection queue faster; providing a verbose logging configuration option; providing an executable for other systems (e.g., libc5 Linux systems, etc.); logging and printing of an error if a new version of the client program 113 exists; database queries that do no take place during the client/server interaction to speed program operation; user selection of a port for use by the client program 113; and use of a timeout value for the client program 113, so connections to the master server 101 do not hang.

The system 100 can store information relating to various processes described herein. This information can be stored in one or more memories, such as a hard disk, optical disk, magneto-optical disk, RAM, etc., of the devices of system 100 One or more databases of the devices and subsystems of the system 100 of FIG. 1 can store the information used to implement the embodiments of the present invention. The databases can be organized using data structures (e.g., records, tables, arrays, fields, graphs, trees, and/or lists) included in one or more memories, such as the memories listed above or any of the storage devices listed below in the discussion of FIG. 5, for example.

The previously described processes can include appropriate data structures for storing data collected and/or generated by the processes of the system 100 of FIG. 1 in one or more databases thereof. Such data structures accordingly can include fields for storing such collected and/or generated data. In a database management system, data can be stored in one or more data containers, each container including records, and the data within each record can be organized into one or more fields. In relational database systems, the data containers can be referred to as tables, the records can be referred to as rows, and the fields can be referred to as columns. In object-oriented databases, the data containers can be referred to as object classes, the records can be referred to as objects, and the fields can be referred to as attributes. Other database architectures can be employed and use other terminology. Systems that implement the embodiments of the present invention are not limited to any particular type of data container or database architecture.

All or a portion of the system 100 (e.g., as described with respect to FIGS. 1-4) can be conveniently implemented using one or more conventional general purpose computer systems, microprocessors, digital signal processors, micro-controllers, etc., programmed according to the teachings of the embodiments of the present invention (e.g., using the computer system of FIG. 5), as will be appreciated by those skilled in the computer and software art(s). Appropriate software can be readily prepared by programmers of ordinary skill based on the teachings of the present disclosure, as will be appreciated by those skilled in the software art. Further, the system 100 can be implemented on the World Wide Web (e.g., using the computer system of FIG. 5). In addition, the system 100 (e.g., as described with respect to FIGS. 1-4) can be implemented by the preparation of application-specific integrated circuits or by interconnecting an appropriate network of conventional component circuits, as will be appreciated by those skilled in the electrical art(s).

Figure 5:
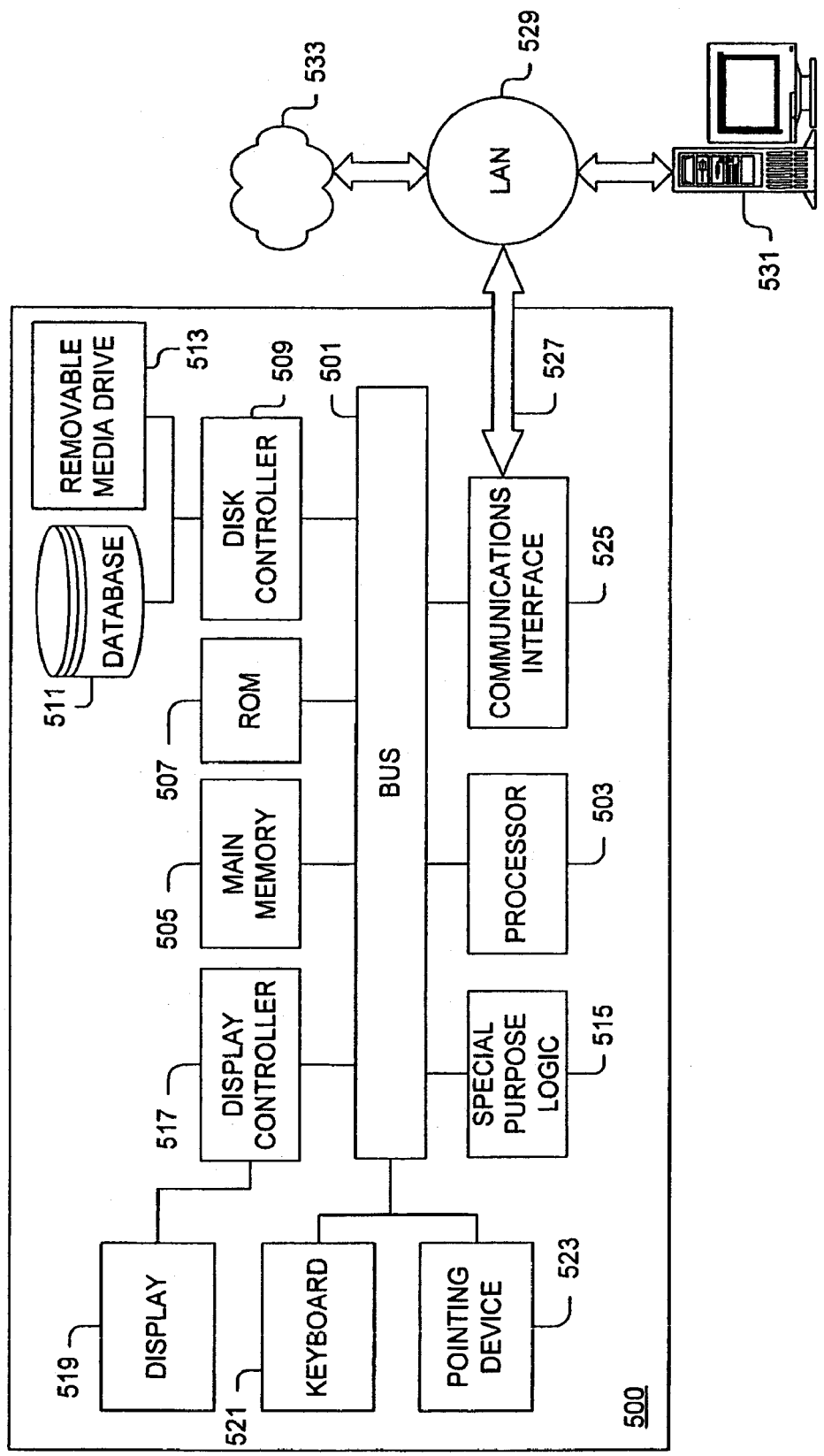
FIG. 5 is an exemplary computer system, which may be programmed to perform one or more of the processes described with respect to FIGS. 1-4.

FIG. 5 illustrates a computer system 500 upon which the embodiments of the present invention (e.g., the devices and subsystems of the system 100 of FIG. 1) can be implemented. The embodiments of the present invention can be implemented on a single such computer system, or a collection of multiple such computer systems. The computer system 500 can include a bus 501 or other communication mechanism for communicating information, and a processor 503 coupled to the bus 501 for processing the information. The computer system 500 also can include a main memory 505, such as a random access memory (RAM), other dynamic storage device (e.g., dynamic RAM (DRAM), static RAM (SRAM), synchronous. DRAM (SDRAM)), etc., coupled to the bus 501 for storing information and instructions to be executed by the processor 503.

In addition, the main memory 505 also can be used for storing temporary variables or other intermediate information during the execution of instructions by the processor 503. The computer system 500 further can include a ROM 507 or other static storage device (e.g., programmable ROM (PROM), erasable PROM (EPROM), electrically erasable PROM (EEPROM), etc.) coupled to the bus 501 for storing static information and instructions.

The computer system 500 also can include a disk controller 509 coupled to the bus 501 to control one or more storage devices for storing information and instructions, such as a magnetic hard disk 511, and a removable media drive 513 (e.g., floppy disk drive, read-only compact disc drive, read/write compact disc drive, compact disc jukebox, tape drive, and removable magneto-optical drive). The storage devices can be added to the computer system 500 using an appropriate device interface (e.g., small computer system interface (SCSI), integrated device electronics (IDE), enhanced-IDE (E-IDE), direct memory access (DMA), or ultra-DMA).

The computer system 500 also can include special purpose logic devices 515, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, communications functions, etc.

The computer system 500 also can include a display controller 517 coupled to the bus 501 to control a display 519, such as a cathode ray tube (CRT), liquid crystal display (LCD), active matrix display, plasma display, touch display, etc., for displaying or conveying information to a computer user. The computer system can include input devices, such as a keyboard 521 including alphanumeric and other keys and a pointing device 523, for interacting with a computer user and providing information to the processor 503. The pointing device 523 can include, for example, a mouse, a trackball, a pointing stick, etc., or voice recognition processor, etc., for communicating direction information and command selections to the processor 503 and for controlling cursor movement on the display 519. In addition, a printer can provide printed listings of the data structures/information of the system shown in FIG. 1, or any other data stored and/or generated by the computer system 500.

The computer system 500 can perform a portion or all of the processing steps of the invention in response to the processor 503 executing one or more sequences of one or more instructions contained in a memory, such as the main memory 505. Such instructions can be read into the main memory 505 from another computer readable medium, such as the hard disk 511 or the removable media drive 513. Execution of the arrangement of instructions contained in the main memory 505 causes the processor 503 to perform the process steps described herein. One or more processors in a multi-processing arrangement also can be employed to execute the sequences of instructions contained in the main memory 505. In alternative embodiments, hard-wired circuitry can be used in place of or in combination with software instructions. Thus, embodiments are not limited to any specific combination of hardware circuitry and/or software.

Stored on any one or on a combination of computer readable media, the embodiments of the present invention can include software for controlling the computer system 500, for driving a device or devices for implementing the invention, and for enabling the computer system 500 to interact with a human user (e.g., users of the system 100 of FIG. 1, etc.). Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

The computer system 500 also can include a communication interface 525 coupled to the bus 501. The communication interface 525 can provide a two-way data communication coupling to a network link 527 that is connected to, for example, a local area network (LAN) 529, or to another communications network 533 (e.g. a wide area network (WAN), a global packet data communication network, such as the Internet, etc.). For example, the communication interface 525 can include a digital subscriber line (DSL) card or modem, an integrated services digital network (ISDN) card, a cable modem, a telephone modem, etc., to provide a data communication connection to a corresponding type of telephone line. As another example, the communication interface 525 can include a local area network (LAN) card (e.g., for Ethernet™, an Asynchronous Transfer Model (ATM) network, etc.), etc., to provide a data communication connection to a compatible LAN. Wireless links can also be implemented. In any such implementation, the communication interface 525 can send and receive electrical, electromagnetic, or optical signals that carry digital data streams representing various types of information. Further, the communication interface 525 can include peripheral interface devices, such as a Universal Serial Bus (USB) interface, a PCMCIA (Personal Computer Memory Card International Association) interface, etc.

The network link 527 typically can provide data communication through one or more networks to other data devices. For example, the network link 527 can provide a connection through the LAN 529 to a host computer 531, which has connectivity to the network 533 or to data equipment operated by a service provider. The LAN 529 and the network 533 both can employ electrical, electromagnetic, or optical signals to convey information and instructions. The signals through the various networks and the signals on the network link 527 and through the communication interface 525, which communicate digital data with computer system 500, are exemplary forms of carrier waves bearing the information and instructions.

The computer system 500 can send messages and receive data, including program code, through the network 529 and/or 533, the network link 527, and the communication interface 525. In the Internet example, a server can transmit requested code belonging to an application program for implementing an embodiment of the present invention through the network 533, the LAN 529 and the communication interface 525. The processor 503 can execute the transmitted code while being received and/or store the code in the storage devices 511 or 513, or other non-volatile storage for later execution. In this manner, computer system 500 can obtain application code in the form of a carrier wave. With the system of FIG. 5, the embodiments of the present invention can be implemented on the Internet as a Web Server 500 performing one or more of the processes according to the embodiments of the present invention for one or more computers coupled to the web server 500 through the network 533 coupled to the network link 527.

The term "computer readable medium" as used herein can refer to any medium that participates in providing instructions to the processor 503 for execution. Such a medium can take many forms, including but not limited to, non-volatile media, volatile media, transmission media, etc. Non-volatile media can include, for example, optical or magnetic disks, magneto-optical disks, etc., such as the hard disk 511 or the removable media drive 513. Volatile media can include dynamic memory, etc., such as the main memory 505. Transmission media can include coaxial cables, copper wire and fiber optics, including the wires that make up the bus 501. Transmission media can also take the form of acoustic, optical, or electromagnetic waves, such as those generated during radio frequency (RF) and infrared (IR) data communications.

As stated above, the computer system 500 can include at least one computer readable medium or memory for holding instructions programmed according to the teachings of the invention and for containing data structures, tables, records, or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the embodiments of the present invention can initially be borne on a magnetic disk of a remote computer connected to either of the networks 529 and 533. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a personal digital assistant (PDA), a laptop, an Internet appliance, etc. An infrared detector on the portable computing device can receive the information and instructions borne by the infrared signal and place the data on a bus. The bus can convey the data to main memory, from which a processor retrieves and executes the instructions. The instructions received by main memory can optionally be stored on storage device either before or after execution by processor.

Although the present invention is described in terms of applications in online gaming over a communications network 123 and/or 125, such as the Internet, the present invention can be applied to online gaming over other communications networks, such as intranets, extranets, Local Area Networks (LANs), etc., as will be appreciated by those skilled in the relevant art(s). For example, the communications network 125 can be an intranet for hosting a LAN online gaming session. In this case, cheaters identified by the anti-cheat software 115 can be transmitted to the master server 101 via the cheater prevention client program 113 over the communications network 123, including the Internet.

Although the present invention is described in terms of cheating prevention client and server programs separate from cheat detection and/or gaming server programs, the cheating prevention client and/or server programs can be implemented as modules included within the cheat detection and/or gaming server programs, as will be appreciated by those skilled in the relevant art(s).

While the present invention have been described in connection with a number of embodiments and implementations, the present invention is not so limited but rather covers various modifications and equivalent arrangements, which fall within the purview of the appended claims.

What is claimed is:

1. A system for preventing cheating during online gaming, the system comprising:
a second online gaming server computer system configured to receive information regarding cheaters detected during online gaming gathered by a first online gaming server computer system, wherein the first online gaming server computer system is configured to gather the information regarding cheaters detected during online gaming; and
a database configured for aggregating the received information regarding cheaters detected during online gaming gathered by the first online gaming server computer system along with information stored in the database regarding cheaters detected during online gaming gathered from multiple online gaming server computer systems,
wherein the aggregated information from the database regarding cheaters detected during online gaming is made available to the second online gaming server computer system,
whereby cheaters identified in the aggregated information from the database are prevented from online gaming on the second online gaming server computer system based on the aggregated information from the database.

2. The system of claim 1, further comprising multiple cheater detection programs configured to gather the received information,
wherein the received information is made available to at least one of an online gaming cheater detection program and online gaming server program running on the second online gaming server computer system.

3. The system of claim 1, further comprising:
a cheater detection program running on the second online gaming server computer system configured to detect cheaters during online gaming,
wherein the second online gaming server computer system is configured to extract information regarding cheaters during online gaming from output of the cheater detection program running on the second online gaming server computer system, and
the second online gaming server computer system is configured to transmit the extracted information regarding cheaters during online gaming to the first online gaming server computer system.

4. The system of claim 3, wherein the second online gaming server computer system is configured to interface with the cheater detection program to extract the information regarding cheaters during online gaming.

5. The system of claim 3, wherein the extracted information regarding cheaters during online gaming includes at least one of timestamps of when cheaters were detected, usernames of detected cheaters, types of cheats used by detected cheaters, or internet protocol addresses of computers systems used by detected cheaters.

6. The system of claim 3, wherein the extracted information regarding cheaters during online gaming includes online gaming identification numbers of detected cheaters.

7. The system of claim 1, further comprising a master file in the database configured to store the aggregated information.

8. The system of claim 7, further comprising means for adding cheaters who are actually banned from a game server to the master file.

9. The system of claim 1, further comprising a cheating prevention server module configured to aggregate the received information and including one or more master servers and master databases, and a cheater prevention server program or software.

10. The system of claim 9, further comprising a cheating prevention client module configured to receive the information regarding cheaters, the module including one or more individual game servers, a cheater prevention client program or software, and a cheat detection program.

11. The system of claim 10, further comprising a game server plugin configured to perform cheater detection on the game servers.

12. The system of claim 10, wherein the cheater prevention client program works in conjunction with an automatic execution scheduling program for scheduled execution operation.

13. The system of claim 10, wherein if a game server is rented from a hosting company, the hosting company supports the cheater prevention client program by providing system and program access and use of the cheater prevention client program.

14. The system of claim 10, wherein the cheater prevention client program is installed by storing a corresponding executable program file script on a game server at which anti-cheat program cheater log files are stored.

15. The system of claim 10, wherein the cheater prevention client program distributes cheater entries to several different files to reduce lag.

16. The system of claim 10, wherein the cheater prevention client program or software connects to the master server to transmit the cheater information.

17. The system of claim 16, wherein the cheater prevention client program is programmed to wait for the cheater prevention server program to perform an authentication process that is selectably turned on or off.

18. A non-transitory computer-readable medium storing computer-executable instructions for preventing cheating during online gaming, the instructions comprising:

instructions for, at a second online gaming server computer system, receiving information regarding cheaters detected during online gaming gathered by a first online gaming server computer system, wherein the first online gaming server computer system is configured to gather the information regarding cheaters detected during online gaming; and instructions for aggregating at a database the received information regarding cheaters detected during online gaming gathered by the first online gaming server computer system along with information stored in the database regarding cheaters detected during online gaming gathered from multiple online gaming server computer systems, wherein the aggregated information from the database regarding cheaters detected during online gaming is made available to the second online gaming server computer system, whereby cheaters identified in the aggregated information from the database are prevented from online gaming on the second online gaming server computer system based on the aggregated information from the database.

19. A method for preventing cheating during online gaming, comprising:

instructions for, at a second online gaming server computer system, receiving information regarding cheaters detected during online gaming gathered by a first online gaming server computer system, wherein the first online gaming server computer system is configured to gather the information regarding cheaters detected during online gaming; and instructions for aggregating at a database the received information regarding cheaters detected during online gaming gathered by the first online gaming server computer system along with information stored in the database regarding cheaters detected during online gaming gathered from multiple online gaming server computer systems, wherein the aggregated information from the database regarding cheaters detected during online gaming is made available to the second online gaming server computer system, whereby cheaters identified in the aggregated information from the database are prevented from online gaming on the second online gaming server computer system based on the aggregated information from the database.

\* \* \* \* \*

UNITED STATES PATENT AND TRADEMARK OFFICE
CERTIFICATE OF CORRECTION

PATENT NO. : 8,360,890 B2
APPLICATION NO. : 12/641920
DATED : January 29, 2013
INVENTOR(S) : Tyler It is certified that error appears in the above-identified patent and that said Letters Patent is hereby corrected as shown below:

In the Specification

In Column 1, Lines 7-11, delete "This application is a divisional application of commonly assigned, U.S. patent application Ser. No. 10/229,023 of TYLER, entitled "ONLINE GAMING CHEATING PREVENTION SYSTEM AND METHOD," filed Aug. 28, 2002, now allowed,"
and insert -- This application is continuation of U.S. Patent Application Serial No. 11/642,722 entitled "ONLINE GAMING CHEATING PREVENTION SYSTEM AND METHOD," filed December 21, 2006, which is a divisional application of commonly assigned U.S. Patent Application Serial No. 10/229,023, entitled "ONLINE GAMING CHEATING PREVENTION SYSTEM AND METHOD," filed August 28, 2002, now U.S. Patent 7,169,050 issued January 30, 2007, --, therefor.

In Column 2, Line 11, delete "theaters" and insert -- cheaters --, therefor.

In Column 6, Line 29, delete "art(s)" and insert -- art(s). --, therefor.

In Column 9, Line 35, delete "do no" and insert -- do not --, therefor.

In Column 10, Line 33, delete "synchronous." and insert -- synchronous --, therefor.

Signed and Sealed this
Eleventh Day of March, 2014

Michelle K. Lee
*Deputy Director of the United States Patent and Trademark Office*